(12) United States Patent
Reddy A V et al.

(10) Patent No.: US 11,188,248 B2
(45) Date of Patent: Nov. 30, 2021

(54) SYSTEM AND METHOD TO ACHIEVE AN UNINTERRUPTED FILE LEVEL BACKUP USING A PASS-THROUGH SNAPSHOT ENGINE

(71) Applicant: EMC IP Holding Company LLC, Hopkinton, MA (US)

(72) Inventors: Mahesh Reddy A V, Bangalore (IN); Chetan Battal, Bangalore (IN); Swaroop Shankar D H, Bangalore (IN); Mahantesh Ambaljeri, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 4 days.

(21) Appl. No.: 16/775,221

(22) Filed: Jan. 28, 2020

(65) Prior Publication Data

US 2021/0232318 A1    Jul. 29, 2021

(51) Int. Cl.
*G06F 3/06*     (2006.01)
*G06F 9/48*     (2006.01)

(52) U.S. Cl.
CPC ............ *G06F 3/065* (2013.01); *G06F 3/0619* (2013.01); *G06F 3/0673* (2013.01); *G06F 9/485* (2013.01)

(58) Field of Classification Search
CPC ...... G06F 3/065; G06F 3/0673; G06F 3/0619; G06F 9/485
See application file for complete search history.

(56) References Cited

U.S. PATENT DOCUMENTS

| | | | |
|---|---|---|---|
| 8,005,797 B1 * | 8/2011 | Chepel ................ | G06F 11/1451 707/649 |
| 8,850,146 B1 * | 9/2014 | Majumdar .......... | G06F 9/45558 711/162 |
| 2021/0034244 A1 * | 2/2021 | Ausarkar ................ | G06F 3/065 |

* cited by examiner

*Primary Examiner* — Hiep T Nguyen
(74) *Attorney, Agent, or Firm* — Womble Bond Dickinson (US) LLP

(57) ABSTRACT

A pass-through snapshot engine records lifecycle data and chronological status of files or objects, in one or more pass-through snapshots during a backup. If there is an abort, the pass-through snapshot engine freezes the pass-through snapshot(s) and terminates the backup. To restart after the abort, the pass-through snapshot engine sends one or more pass-through snapshots to the backup agent. The backup agent restarts the backup, and enforces states of lifecycle and chronology to files or objects, and discards files or objects that have already been backed up to the target device, in accordance with the one or more pass-through snapshots.

20 Claims, 7 Drawing Sheets

SYSTEM AND METHOD TO ACHIEVE AN UNINTERRUPTED FILE LEVEL BACKUP USING A PASS-THROUGH SNAPSHOT ENGINE

BACKGROUND

Regular backups protect computers and data systems from data loss, worldwide. Unexpected events causing backups to abort are problematic. The need to start successive backups from the point of interrupt to avoid a backup window increase has become of great interest nowadays. For example, while a backup is in progress, and due to some random unintended event, the backup could be aborted abruptly, causing the data to be half written back to the target device. Also, the backup would then be rolled back after this point resulting in unusable data. Such a situation would also lead to an increase of backup window. Another problem resulting from an aborted backup is that the backup must be restarted from the beginning even though there is some portion of the backup that was already completed.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
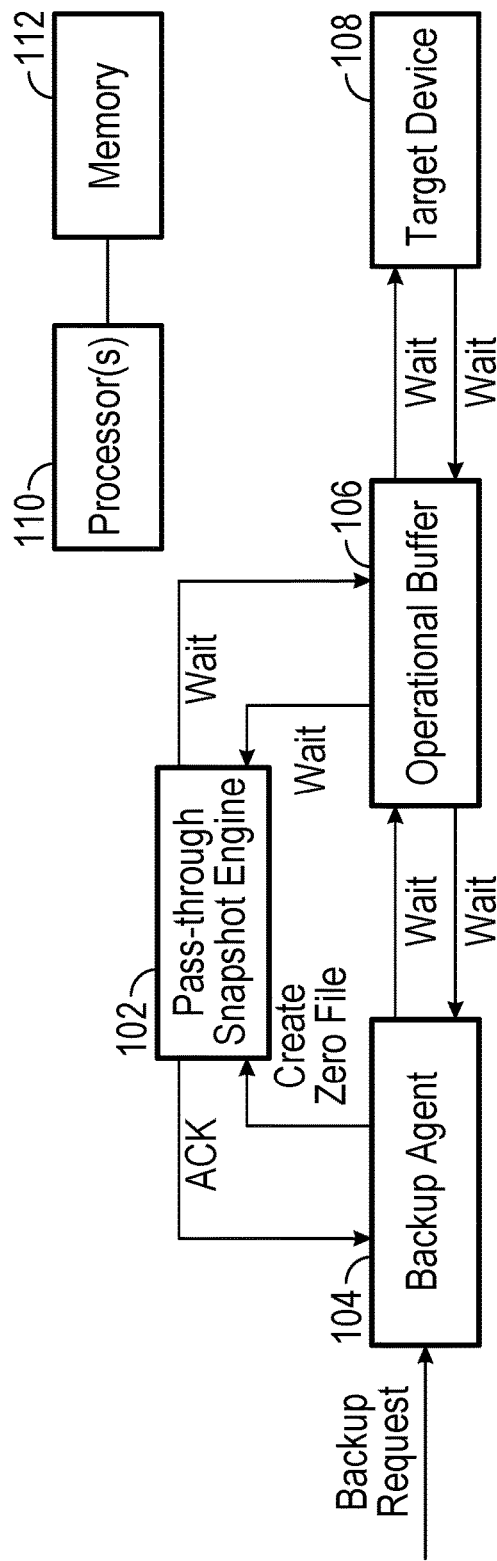
FIG. 1 illustrates step 1 of a backup process performed by a pass-through snapshot engine, a backup agent, an operational buffer and a target storage device, in an embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A pass-through snapshot engine for backups, and a related pass-through snapshot system for backups, are described herein in various embodiments that mitigate the risk of backup window increase after an abort during the backup operation. As an example scenario of usage of the pass-through snapshot engine and system, a backup administrator would prefer a backup application that provides the SLA (service level agreement) of achieving any successive backup from an improper, random or unintended abort to be continuous in nature. The aim of the backup administrator during such backup abort scenarios is to have the successive backup started from the point of abort, without the necessity of having to restart from the beginning, to avoid any further increase in the restore window.

To satisfy this aim, a data probe approach is used to identify the abrupt abort during a backup operation and ensure a safe uninterrupted backup from the aborted point in the next backup session (or, resumption of the aborted backup session). Various embodiments of a pass-through snapshot system, a method, and a tangible computer-readable media described herein use a pass-through snapshot engine, which holds the chronological as well as lifecycle details of the file, file objects, or objects to be write latched for the backup operation at any instant of time. A backup agent utilizes these pass-through snapshots after an aborted backup to understand the current batch of files, file objects or other objects that are to be consumed for the immediate write operation resulting in an uninterrupted backup session.

Embodiments of the pass-through snapshot engine provide a solution to avoid an increase in the backup window due to an unexpected abort. This solution ensures an uninterrupted backup service after an unintended termination of the backup session.

Once a backup session begins, a backup agent receives the file objects that need to be write latched into a target storage device for the write operation of the backup. For each file, file object, other object, or batch of files, file objects or other objects, the snapshot pass-through engine creates a zero file and starts recording the life cycle properties, base data, pointers and source of the file, file objects or other objects in the form of a pass-through snapshot. In various embodiments, this could be done with one pass-through snapshot per file, file object or other object, or one large snapshot for all of the files, file objects or other objects, or multiple snapshots, etc.

After the initialization, when a file, file object or other object starts to route from the backup agent, the chronology (i.e., time status of the file, file object or other object during the backup process) would start to be recorded in the pass-through snapshot(s) in the pass-through engine. For example, the chronology could be a time stamp or a state of the file from the user's perspective, e.g., time t0 for when the file was being read by a user, time t1 for when the file is closed by the user, time t2 for when the file is changed because of a copy paste request. The backup agent and the operational buffer would continuously indicate the life cycle data (i.e., data of the entire lifecycle of the file, file object or other object) as well as the chronological data (i.e., time-based status during the backup process) of each file, file object or other object in the system under the backup session.

For example, life cycle is the status of the file or file object from the backup agent perspective. At what stage is the file? At time t0, the file was being read by the backup agent blocked by some by some mutex or semaphore. At t1, the file would be read by the pass-through engine to collect the file properties. At time t2, the file might be being broken down or encoded into a target storable format. At time t3, the file may be inside an operational buffer ready to be copied onto the target device. This is lifecycle of file object, in one example. The chronological data is, for example, the collective form of the chronology as above. The following process, described in a series of steps, illustrates one embodiment. Variations, in which various actions are performed in a related series of steps are readily devised in keeping with the teachings herein.

In one embodiment, a pass-through snapshot engine is for backups. The pass-through snapshot engine has a memory and one or more processors. The processor(s) are to record, in a pass-through snapshot in the memory, lifecycle data of each file or object that a backup agent routes to an operational buffer, during a backup. The processor(s) are to record, in the pass-through snapshot in the memory, chronological status of each file or object that the operational buffer routes to a target device for storage of backup files or objects, during the backup. The processor(s) are to freeze the pass-through snapshot in the memory and terminate the backup, responsive to an abort. The processors are to send one or more pass-through snapshots to the backup agent so that the backup agent restarts the backup, enforces states of lifecycle and chronology to files or objects and discards files or objects that have already been backed up to the target device, in accordance with the one or more pass-through snapshots, to restart after the abort.

In one embodiment, a pass-through snapshot system is for backups. The system has a memory, one or more processors, a backup agent to backup files or objects during a backup session. The system has an operational buffer, to route the files are objects to a target storage device during the backup session. And, the system has a pass-through snapshot engine. The pass-through snapshot engine is to record, in a pass-through snapshot in the memory, lifecycle data of each file or object the backup agent routes to the operational buffer during the backup session. The pass-through snapshot engine is to record in the pass-through snapshot in the memory, chronological status of each file or object the operational buffer routes to the target storage device during the backup session. The pass-through snapshot engine is to freeze the pass-through snapshot in the memory and terminate the backup, responsive to an abort. The pass-through snapshot engine is to send one or more pass-through snapshots to the backup agent, to restart after the abort. This is so that the backup agent restarts the backup, enforces states of lifecycle and chronology to files or objects and discards files or objects that have already been backed up to the target device in accordance with the one or more pass-through snapshots.

In one embodiment, there is a method for backups, using pass-through snapshots. The method includes recording, in a pass-through snapshot in a memory, lifecycle data of each file or object a backup agent routes to an operational buffer during a backup session. The method includes recording, in the pass-through snapshot in the memory, chronological status of each file or object the operational buffer routes to a target storage device during the backup session. The method includes freezing the pass-through snapshot in the memory and terminating the backup session, responsive to an abort. The method includes sending one or more pass-through snapshots to the backup agent. The method includes restarting the backup session after the abort, with the backup agent enforcing states of lifecycle and chronology to files or objects and discarding files or objects that have already been backed up to the target storage device, in accordance with the one or more pass-through snapshots.

In one embodiment, a tangible, non-transitory, computer-readable media has instructions. The instructions, when executed by a processor, cause the processor to perform actions. The processor is to record, in a pass-through snapshot, lifecycle data of each file or object a backup agent routes to an operational buffer, during a backup. The processor is to record, in the pass-through snapshot, chronological status of each file or object the operational buffer routes to a target device for storage of backup files or objects, during the backup. The processor is to freeze the pass-through snapshot and terminate the backup, responsive to an abort. The processor is to send one or more pass-through snapshots to the backup agent so that the backup agent restarts the backup, enforces states of lifecycle and chronology to files or objects and discards files or objects that have already been backed up to the target device, in accordance with the one or more pass-through snapshots, to restart after the abort.

FIG. 1 illustrates step 1 of a backup process performed by a pass-through snapshot engine 102, a backup agent 104, an operational buffer 106 and a target storage device 108, in an embodiment. Each of these components can be implemented in hardware, firmware, or software executing on one or more processors 110, using memory 112, or combinations thereof, in various embodiments. The target storage device 108 has storage memory. Together, the pass-through snapshot engine 102, backup agent 104 and operational buffer 106 form a pass-through snapshot system, in one embodiment. Yet another embodiment includes the target storage device 108.

In step 1, a batch of files, file objects or other objects, or a single file or object is received by the backup agent 104, which indicates to the pass-through snapshot engine 102 to create the zero file. The zero file is a simple file that is opened as a placeholder for all the consequent operations, in order to obtain a pass-through snapshot. In the zero file, all the life cycle data is loaded as an initialization step.

Figure 2:
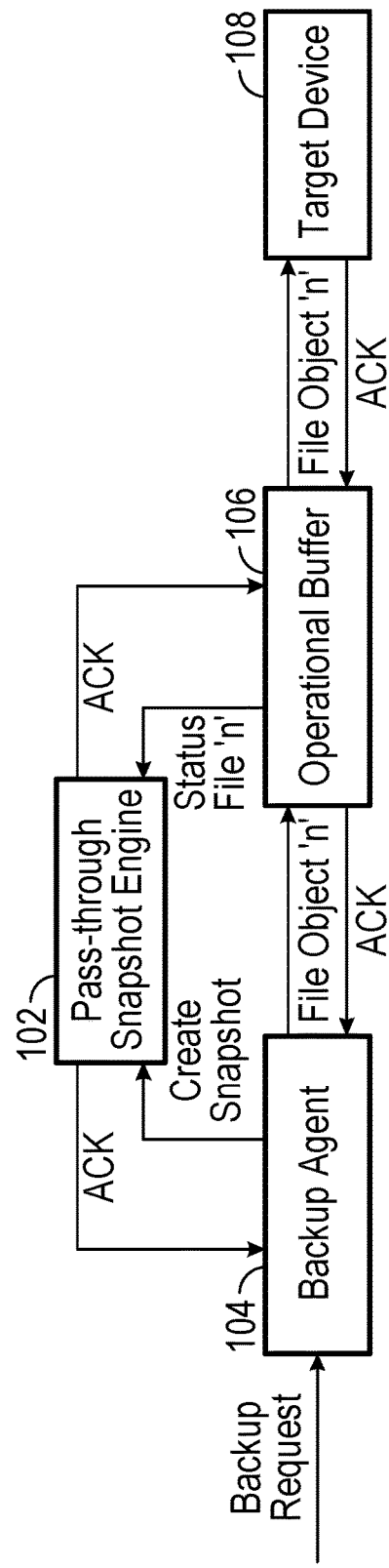
FIG. 2 illustrates step 2 of the backup process, in an embodiment.

FIG. 2 illustrates step 2 of the backup process, in an embodiment. In step 2, the actual pass-through snapshot is created from the zero file. The backup agent 104 starts routing the file, file objects or other object(s) to the operational buffer 106 and indicates the chronology of the file or object along with its life cycle data at that instant of time. In one embodiment, the operational buffer 106 sends the chronology status for each file, file object or other object to the pass-through snapshot engine 102, which writes this into a corresponding pass-through snapshot. At the same time, the other modules in the system are in wait mode. The same happens when the operational buffer 106 receives and reroutes the files, file objects or other objects to the target storage device 108. Finally, when the file, file object or other object is write-latched for the final write operation at the target storage device 108, the operational buffer 106 indicates the chronology to the pass-through snapshot engine 102 for writing to the pass-through snapshot, and waits for write completion.

Figure 3:
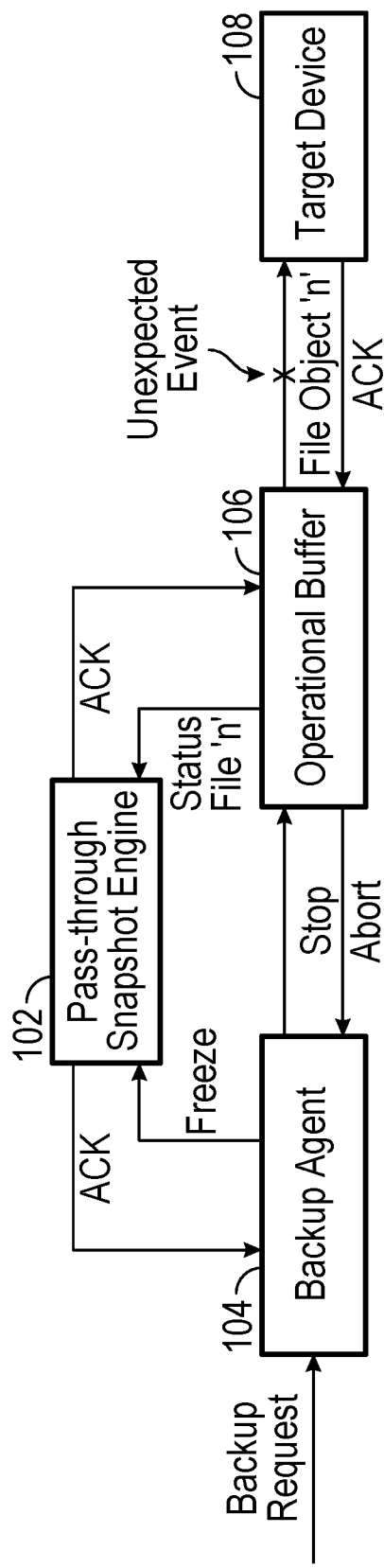
FIG. 3 illustrates step 3 of the backup process, in an embodiment.

FIG. 3 illustrates step 3 of the backup process, in an embodiment. In step 3, in the case where an abort occurs in between beginning and expected end of a backup, the operational buffer 106 indicates an unexpected event to the backup agent 104 for termination of the backup, e.g., abort. Consequently, the backup agent 104 freezes the pass-through snapshot (in this embodiment, directs the pass-through snapshot engine 102 to freeze the pass-through snapshot), and terminates the backup.

Figure 4:
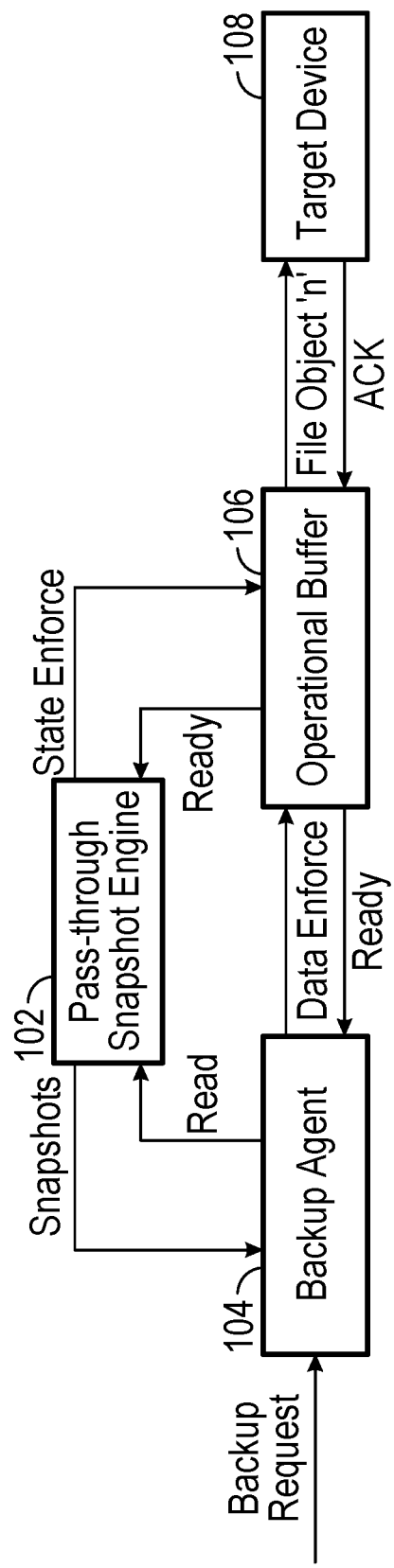
FIG. 4 illustrates step 4 of the backup process, in an embodiment.

FIG. 4 illustrates step 4 of the backup process, in an embodiment. The backup agent 104 receives a backup request, which could be a repeat of the original backup request or a request to restart the backup. In step 4, upon restart of the backup session, the backup agent 104 reads the pass-through snapshots that the pass-through snapshot engine 102 sends to the backup agent 104, and enforces the same states of lifecycle and chronology to the files, file objects or other objects in the received burst or sequence and discards the rest of them, in accordance with the pass-through snapshots. Then, step 2 is repeated in some embodiments, to ensure an uninterrupted backup session.

Figure 5:
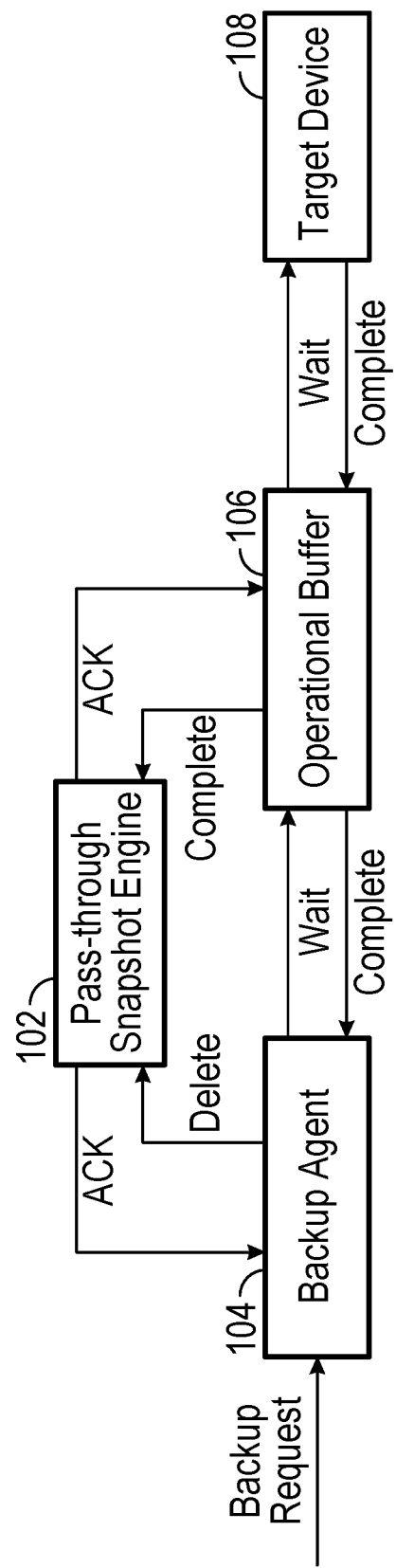
FIG. 5 illustrates step 5 of the backup process, in an embodiment.

FIG. 5 illustrates step 5 of the backup process, in an embodiment. In step 5, in the case of no abort, the write is acknowledged by the target storage device 108, which passes along this indication to the backup agent 104. The backup agent 104 then requests the pass-through snapshot engine 102 to delete the corresponding pass-through snapshots.

Figure 6:
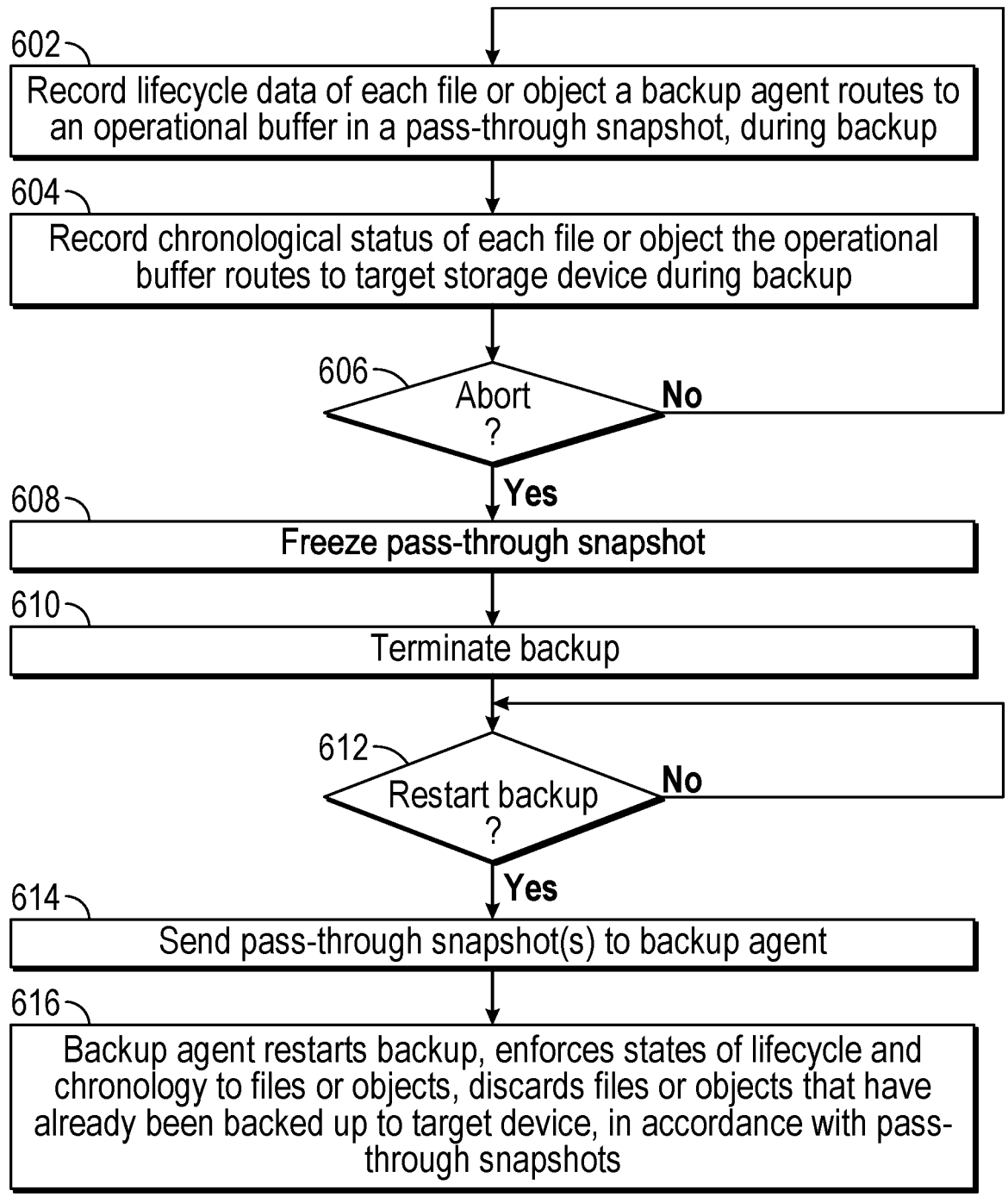
FIG. 6 is a flow diagram of a method for backups, using pass-through snapshots, which can be performed by embodiments of a pass-through snapshot engine and a pass-through snapshot system described herein.

FIG. 6 is a flow diagram of a method for backups, using pass-through snapshots, which can be performed by embodiments of a pass-through snapshot engine and a pass-through snapshot system described herein. The method can be practiced by one or more processors, and embodied in instructions on a non-transient, tangible, computer-readable media for execution by a processor.

In an action 602, the pass-through snapshot engine records lifecycle data of each file or object a backup agent routes to an operational buffer. The lifecycle data is recorded in a pass-through snapshot, during backup.

In an action 604, the pass-through snapshot engine records chronological status of each file or object the operational buffer routes to a target storage device during backup. The chronological status is recorded in the pass-through snapshot.

In an action 606, the system determines whether there is an abort. If no, there is no abort, flow proceeds back to actions 602 and 604 to continue recording lifecycle data and chronological status of each file or object, in a pass-through snapshot. If yes, there is an abort, flow proceeds to the action 608.

In an action 608, the pass-through snapshot engine freezes the pass-through snapshot. In an action 610, the pass-through snapshot engine, and the system, terminates the backup.

In an action 612, the system determines whether there is a restart for the backup. If the answer is no, flow loops at the action 612 (or proceeds elsewhere for further tasks, in further embodiments). If the answer is yes, flow proceeds to the action 614.

In an action 614, the pass-through snapshot engine sends one or more snapshots to the backup agent.

In an action 616, the backup agent restarts the backup. The backup agent enforces states of lifecycle and chronology to files or objects, and discards files or objects that have already been backed up to the target device. This activity is in accordance with the one or more pass-through snapshots that the pass-through snapshot engine sent to the backup agent.

Various embodiments of backup systems are described below. Storage systems used therein for backup source or backup destination could have various forms of storage memory and architecture, and may use compression, deduplication, encryption, error correction and/or other storage system processes in various combinations. Further embodiments of these backup systems are readily devised, with components in separate devices or combined in various devices.

Figure 7A:
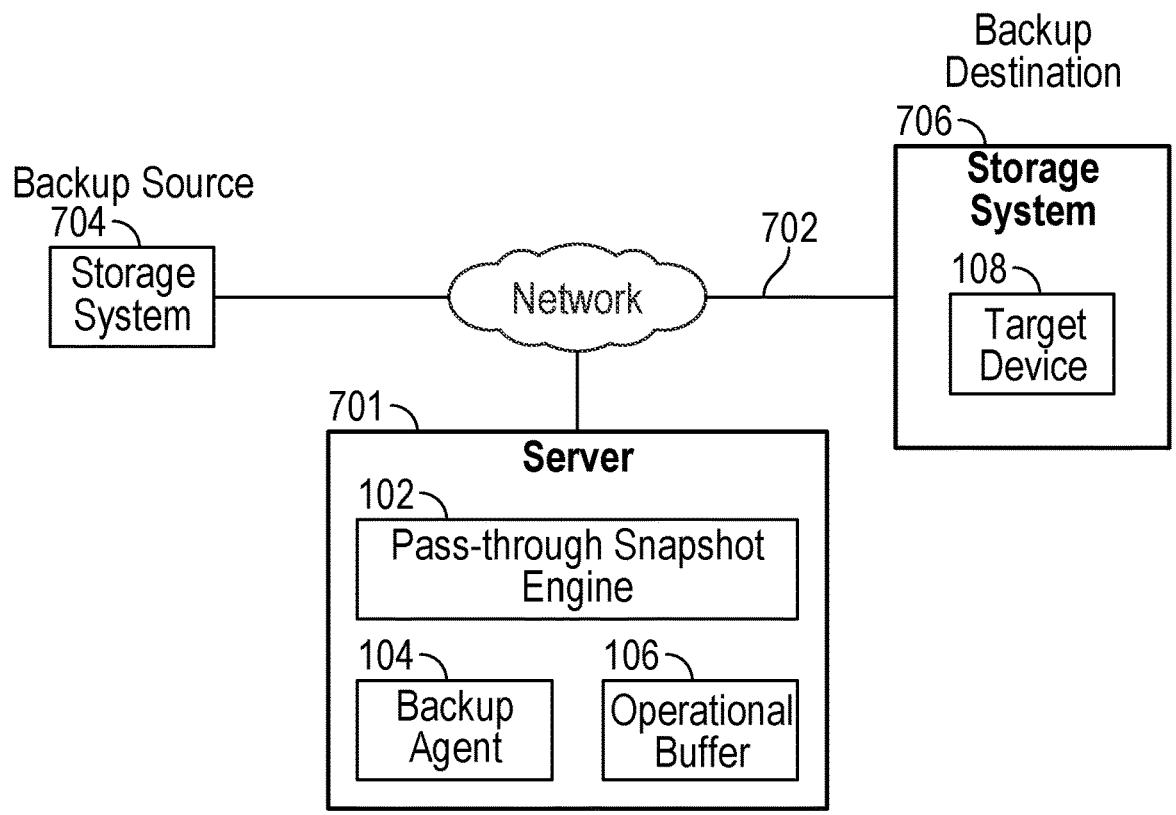
FIG. 7A illustrates an embodiment of a backup system, with a pass-through snapshot engine, backup agent and operational buffer in a server, performing a backup from a storage system as a backup source to another storage system as a backup destination.

FIG. 7A illustrates an embodiment of a backup system, with a pass-through snapshot engine 102, backup agent 104 and operational buffer 106 in a server 701, performing a backup from a storage system 704 as a backup source to another storage system 706 as a backup destination. The target device 108, to which the backed up files, file objects or other objects or routed by the operational buffer 106, is in the storage system 706. Components in this and further embodiments communicate over a network 702, which could be wired or wireless, or a bus or other communication path in variations. In a further embodiment, the backup agent 104 could be integrated with the storage system 704 as a backup source and/or the operational buffer 106 could be integrated with the storage system 706 as a backup destination.

Figure 7B:
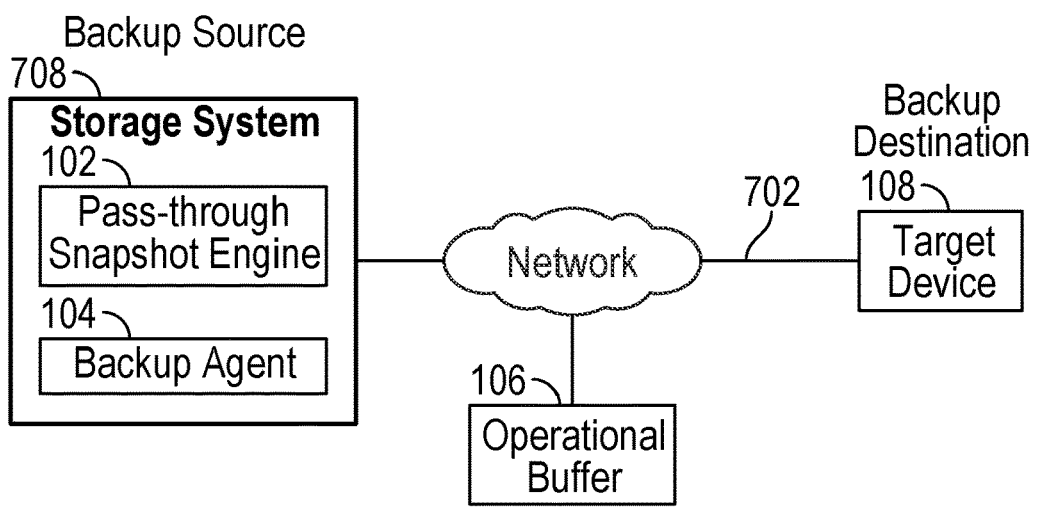
FIG. 7B illustrates a further embodiment of a backup system, with a backup agent and a pass-through snapshot engine integrated with a storage system in a backup source, performing a backup through an operational buffer to a target device as a backup destination.

FIG. 7B illustrates a further embodiment of a backup system, with a backup agent 104 and a pass-through snapshot engine 102 integrated with a storage system 708 in a backup source, performing a backup through an operational buffer 106 to a target device 108 as a backup destination. The operational buffer 106 is shown as a network device or part of a network device on the network 702 in this embodiment, and could be integrated with the backup source or the backup destination in further embodiments.

Figure 7C:
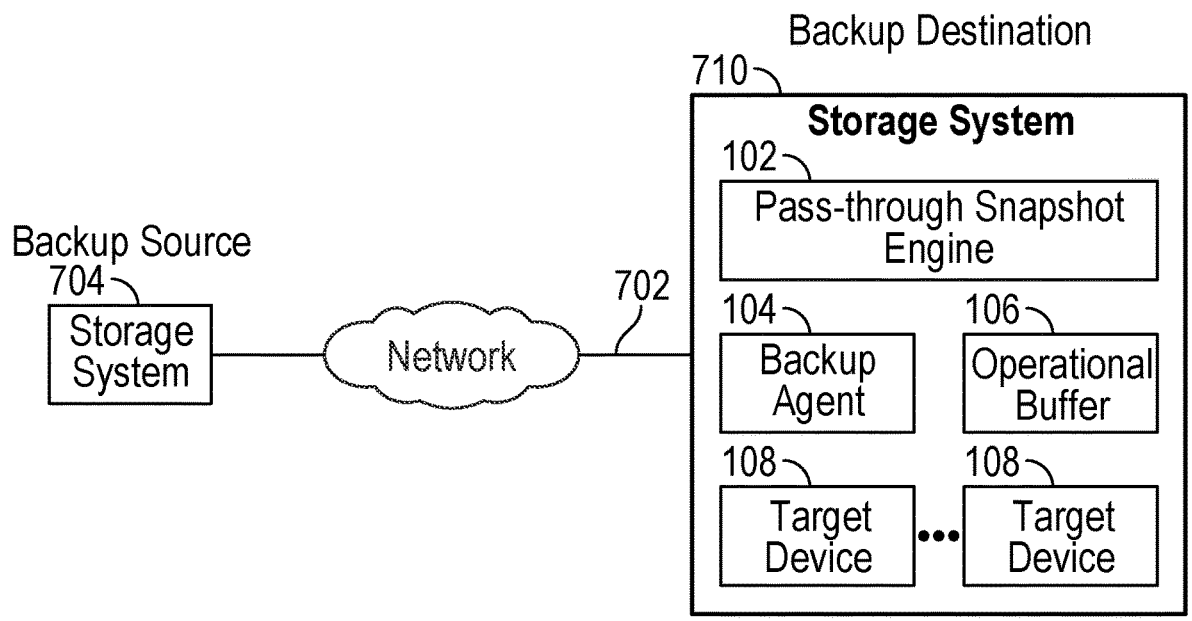
FIG. 7C illustrates a further embodiment of a backup system, with a backup agent, a pass-through snapshot engine and an operational buffer integrated with a storage system as a backup destination, performing a backup of a storage system as a backup source.

FIG. 7C illustrates a further embodiment of a backup system, with a backup agent 104, a pass-through snapshot engine 102 and an operational buffer 106 integrated with a storage system 710 as a backup destination, performing a backup of a storage system 704 as a backup source. The operational buffer 106 routes backed up files, file objects or other objects to one or more of the target devices 108 in the storage system 710.

Figure 8:
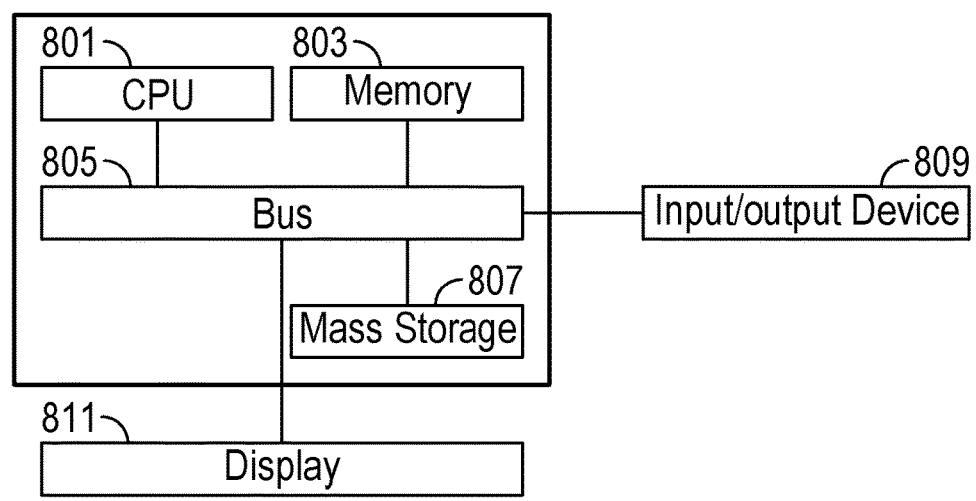
FIG. 8 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for backups with a pass-through snapshot engine in accordance with some embodiments. The computing device includes a central processing unit (CPU) 801, which is coupled through a bus 805 to a memory 803, and mass storage device 807. Mass storage device 807 represents a persistent data storage device such as a disc drive, which may be local or remote in some embodiments. The mass storage device 807 could implement a backup storage, in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 805 in order to communicate information in command selections to CPU 801. It should be appreciated that data to and from external devices may be communicated through the input/output device 809. CPU 801 can be defined to execute the functionality described herein to enable the functionality described with reference to FIGS. 1-7C. The code embodying this functionality may be stored within memory 803 or mass storage device 807 for execution by a processor such as CPU 801 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may also be integrated with a virtualized computing system implemented with physical computing resources.

Figure 9:
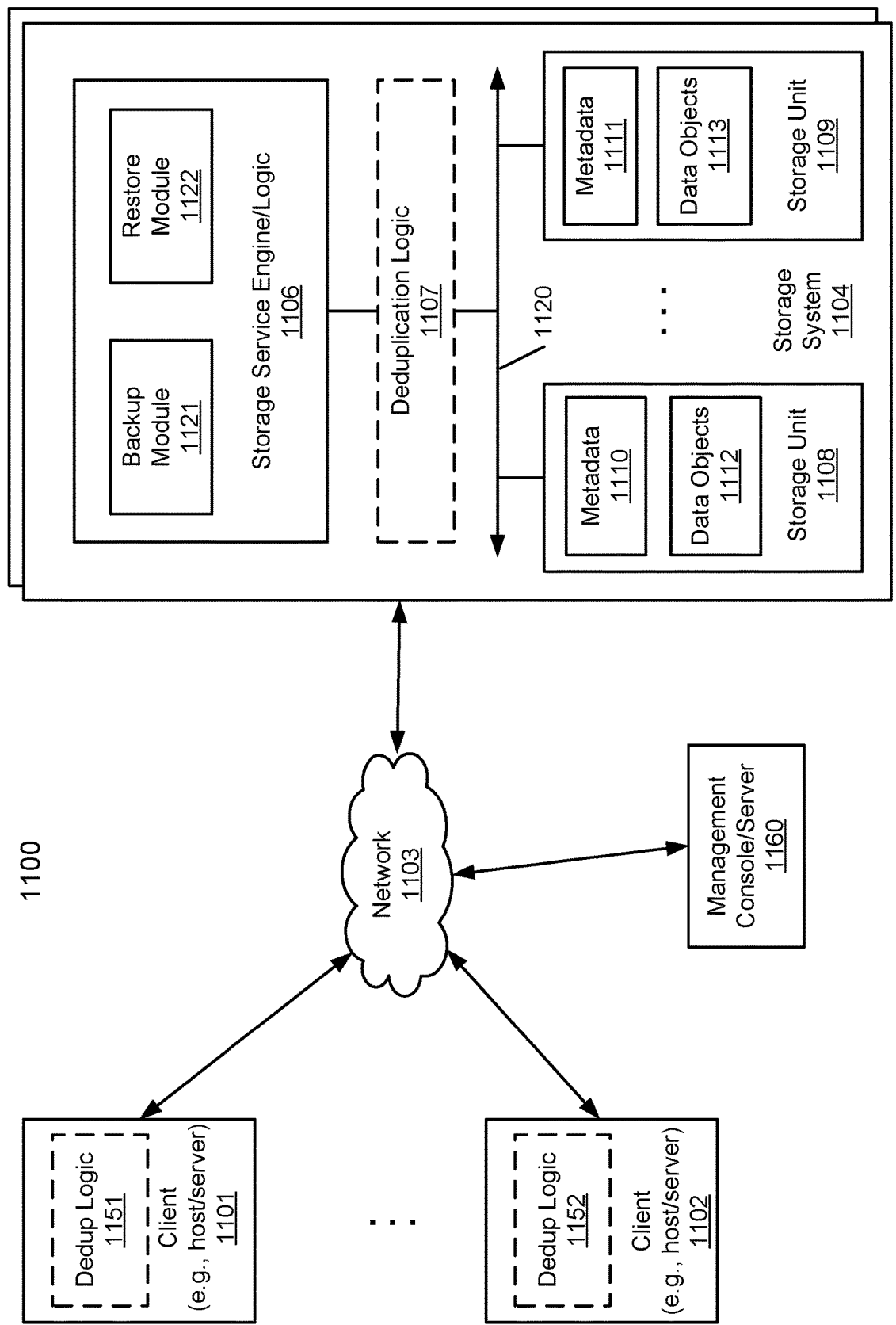
FIG. 9 shows an example of a storage system according to one embodiment.

FIG. 9 is a block diagram illustrating a storage system according to one embodiment of the invention. Referring to FIG. 9, system 1100 includes, but is not limited to, one or more client systems 1101-1102 communicatively coupled to storage system 1104 over network 1103. Clients 1101-1102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 1101-1102 may be a primary storage system (e.g., local data center) that provides storage to other local clients, which may periodically back up the content stored therein to a backup storage system (e.g., a disaster recovery site or system), such as storage system 1104. Network 1103 may be any type of networks such as a local area network (LAN), a wide area network (WAN) such as the Internet, a fiber network, a storage network, or a combination thereof, wired or wireless. Clients 1101-1102 may be in physical proximity or may be physically remote from one another. Storage system 1104 may be located in proximity to one, both, or neither of clients 1101-1102. In one embodiment, the pass-through snapshot engine and the techniques as described above can be implemented in any of the client devices 1101-1102, management server 1160 (e.g., a backup server), and/or storage system 1104.

Storage system 1104 may include or represent any type of servers or a cluster of one or more servers (e.g., cloud servers). For example, storage system 1104 may be a storage server used for various different purposes, such as to provide multiple users or client systems with access to shared data and/or to back up (or restore) data (e.g., mission critical data). Storage system 1104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 1104 may further provide storage services via an object-based protocol and Hadoop distributed file system (HDFS) protocol.

In one embodiment, storage system 1104 includes, but is not limited to, storage service engine 1106 (also referred to as service logic, service module, or service unit, which may be implemented in software, hardware, or a combination thereof), optional deduplication logic 1107, and one or more storage units or devices 1108-1109 communicatively coupled to each other. Storage service engine 1106 may represent any storage service related components configured or adapted to provide storage services (e.g., storage as a service) to a variety of clients using any of the access protocols set forth above. For example, storage service engine 1106 may include backup logic 1121 and restore logic 1122. Backup logic 1121 is configured to receive and back up data from a client (e.g., clients 1101-1102) and to store the backup data in any one or more of storage units 1108-1109. Restore logic 1122 is configured to retrieve and restore backup data from any one or more of storage units 1108-1109 back to a client (e.g., clients 1101-1102).

Storage units 1108-1109 may be implemented locally (e.g., single node operating environment) or remotely (e.g., multi-node operating environment) via interconnect 1120, which may be a bus and/or a network (e.g., a storage network or a network similar to network 1103). Storage units 1108-1109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 1108-1109 may be located locally or remotely accessible over a network.

In response to a data file to be stored in storage units 1108-1109, according to one embodiment, deduplication logic 1107 is configured to segment the data file into multiple segments (also referred to as chunks) according to a variety of segmentation policies or rules. Deduplication logic 1107 may choose not to store a segment in a storage unit if the segment has been previously stored in the storage unit. In the event that deduplication logic 1107 chooses not to store the segment in the storage unit, it stores metadata enabling the reconstruction of the file using the previously stored segment. As a result, segments of data files are stored in a deduplicated manner, either within each of storage units 1108-1109 or across at least some of storage units 1108-1109. The metadata, such as metadata 1110-1111, may be stored in at least some of storage units 1108-1109, such that files can be accessed independent of another storage unit. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 1107 is to maintain only a single copy of each unique set of data within a data set. To achieve that goal, deduplication logic 1107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 1107 identifies data blocks that can potentially be deduplicated by comparing digests of data blocks with list of digests stored in the index table. Further, when data blocks are deduplicated after comparing digest information, deduplication logic 1107 updates metadata of deduplicated data blocks. Additionally, deduplication logic 1107 updates metadata of a data block when the data block is reduplicated.

In one embodiment, any of clients 1101-1102 may further include an optional deduplication logic (e.g., deduplication logic 1151-1152) having at least a portion of functionalities of deduplication logic 1107. Deduplication logic 1151-1152 are configured to perform local deduplication operations, respectively. For example, prior to transmit data to storage system 1104, each of the deduplication logic 1151-1152 may deduplicate the data into deduplicated segments and determine whether a particular deduplicated segment has already been stored in storage system 1104. A deduplicated segment is transmitted to storage system 1104 only if the deduplicated segment has not been stored in storage system 1104.

For example, when client 1101 is about to transmit a data stream (e.g., a file or a directory of one or more files) to storage system 1104, deduplication logic 1151 is configured to deduplicate the data stream into deduplicated segments. For each of the deduplicated segments, client 1101 transmits a fingerprint or representative of the deduplicated segment to storage system 1104 to determine whether that particular deduplicated segment has already been stored in storage system 1104. A deduplicated segment that has been stored in storage system 1104 may be previously received from the same client 1101 or from another client such as client 1102. In response to a response from storage system 1104 indicating that the segment has not been stored in storage system 1104, that particular segment is then transmitted over to the storage system 1104. As a result, the network traffic or bandwidth and the processing resources required can be greatly reduced.

In one embodiment, storage system 1104 further includes a storage manager or storage controller (not shown) configured to manage storage resources of storage system 1104, such as, for example, storage space and processing resources (e.g., processor, memory, network resources). The storage manager or controller may be accessed by an administrator of management console or server 1160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A pass-through snapshot engine for backups, comprising:
    a memory; and
    one or more processors, to:
        record, in a pass-through snapshot in the memory, life cycle data that indicates completed portions of processes for backing up each file or object scheduled for backing up by a backup agent using an operational buffer during a backup;
        record, in the pass-through snapshot in the memory, chronological data that indicates all interactions, after the backup has started, with each file or object scheduled for the backing up in a target device during the backup;
        freeze the pass-through snapshot in the memory and terminate the backup, responsive to an abort of the backup prior to completion; and
        send one or more pass-through snapshots to the backup agent so that the backup agent restarts the backup, enforces states of lifecycle and chronology to files or objects and discards files or objects that have already been backed up to the target device, in accordance with the one or more pass-through snapshots, to restart after the abort.

2. The pass-through snapshot engine for backups of claim 1, wherein the one or more processors are further to:
    initialize a zero file in the memory, as a placeholder for pass-through snapshots comprising the life cycle data, responsive to the backup agent indicating receiving a backup request.

3. The pass-through snapshot engine for backups of claim 1, wherein the one or more processors are further to:
    delete the one or more pass-through snapshots, responsive to a request from the backup agent in acknowledgment of completion of a write, which completes the backup, by the target device.

4. The pass-through snapshot engine for backups of claim 1, wherein the life cycle data is received by the pass-through snapshot engine from the backup agent.

5. The pass-through snapshot engine for backups of claim 1, wherein the chronological data is received by the pass-through snapshot engine from the operational buffer.

6. The pass-through snapshot engine for backups of claim 1, wherein the restart does not start from a beginning of the backup.

7. The pass-through snapshot engine for backups of claim 1, wherein the backup agent utilizes the one or more pass-through snapshots to understand a current batch of files or objects that have to be consumed for an immediate write operation resulting in an uninterrupted backup session.

8. A method for backups, using pass-through snapshots, comprising:
    recording, in a pass-through snapshot in a memory, life cycle data that indicates completed portions of processes for backing up each file or object scheduled for backing up by a backup agent using an operational buffer during a backup session;
    recording, in the pass-through snapshot in the memory, chronological data that indicates all interactions, after the backup session has started, with each file or object scheduled for backing up in a target storage device during the backup session;
    freezing the pass-through snapshot in the memory and terminating the backup session, responsive to an abort of the backup session prior to completion;

sending one or more pass-through snapshots to the backup agent; and restarting the backup session after the abort, with the backup agent enforcing states of lifecycle and chronology to files or objects and discarding files or objects that have already been backed up to the target storage device, in accordance with the one or more pass-through snapshots.

9. The method for backups, using pass-through snapshots, of claim 8, further comprising:

initializing a zero file in the memory, as a placeholder for pass-through snapshots comprising the life cycle data, responsive to the backup agent indicating receiving a backup request.

10. The method for backups, using pass-through snapshots, of claim 8, further comprising:

deleting the one or more pass-through snapshots, responsive to a request from the backup agent in acknowledgment of completion of a write, which completes the backup session, by the target storage device.

11. The method for backups, using pass-through snapshots, of claim 8, further comprising:

sending the life cycle data from the backup agent to a pass-through snapshot engine.

12. The method for backups, using pass-through snapshots, of claim 8, further comprising:

sending the chronological data from the operational buffer to a pass-through snapshot engine.

13. The method for backups, using pass-through snapshots, of claim 8, wherein the restart does not start from a beginning of the backup session.

14. The method for backups, using pass-through snapshots, of claim 8, further comprising:

utilizing, by the backup agent, the one or more pass-through snapshots to understand a current batch of files or objects that have to be consumed for an immediate write operation resulting in an uninterrupted backup session.

15. A non-transitory computer-readable medium having instructions thereupon which, when executed by a processor, cause the processor to:

record, in a pass-through snapshot, life cycle data that indicates completed portions of processes for backing up each file or object scheduled for backing up by a backup agent using an operational buffer during a backup;

record, in the pass-through snapshot, chronological data that indicates all interactions, after the backup has started, with each file or object scheduled for backing up in a target device during the backup;

freeze the pass-through snapshot and terminate the backup, responsive to an abort of the backup prior to completion; and send one or more pass-through snapshots to the backup agent so that the backup agent restarts the backup, enforces states of lifecycle and chronology to files or objects and discards files or objects that have already been backed up to the target device, in accordance with the one or more pass-through snapshots, to restart after the abort.

16. The non-transitory computer-readable medium of claim 15, wherein the instructions further cause the processor to:

initialize a zero file, as a placeholder for pass-through snapshots comprising the life cycle data, responsive to the backup agent indicating receiving a backup request.

17. The non-transitory computer-readable medium of claim 15, wherein the instructions further cause the processor to:

delete the one or more pass-through snapshots, responsive to a request from the backup agent in acknowledgment of completion of a write, which completes the backup, by the target device.

18. The non-transitory computer-readable medium of claim 15, wherein the instructions further cause the processor to receive the life cycle data from the backup agent.

19. The non-transitory computer-readable medium of claim 15, wherein the instructions further cause the processor to receive the chronological data from the operational buffer.

20. The non-transitory computer-readable medium of claim 15, wherein instructions further cause the processor to utilize the one or more pass-through snapshots to understand a current batch of files or objects that have to be consumed for an immediate write operation resulting in an uninterrupted backup session.

* * * * *